United States Patent [19]
Gautier et al.

[11] Patent Number: 4,790,235
[45] Date of Patent: Dec. 13, 1988

[54] BRAKE BOOSTER UNIT MOUNTED ON A FIXED WALL OF A VEHICLE AND PROCESS FOR ASSEMBLING SUCH A UNIT

[75] Inventors: Jean-Pierre Gautier, Aulnay Sous Bois; Jean-Claude Blot, Louvres, both of France

[73] Assignee: Bendix France, Drancy, France

[21] Appl. No.: 92,839

[22] Filed: Sep. 3, 1987

[30] Foreign Application Priority Data

Sep. 10, 1986 [FR] France ............................. 86 12668

[51] Int. Cl.$^4$ .................... F01B 29/00; F01B 11/02
[52] U.S. Cl. ............................... 92/128; 92/161; 92/169; 248/222.3; 403/348
[58] Field of Search ............... 92/146, 161, 169.1, 92/169.2, 169.3, 169.4, 128; 248/222.3, 223.2; 403/348, 349; 286/661

[56] References Cited
U.S. PATENT DOCUMENTS

3,312,147  4/1967  Reichard .............................. 91/369
4,372,517  2/1983  Welch et al. ................. 248/222.3 X

FOREIGN PATENT DOCUMENTS

124223  11/1984  European Pat. Off. .............. 92/161
1512696  2/1968  France .
617576  2/1949  United Kingdom .

*Primary Examiner*—Robert E. Garrett
*Assistant Examiner*—Mark A. Williamson
*Attorney, Agent, or Firm*—Larry J. Palguta; Ken C. Decker

[57] ABSTRACT

The assembly nut (5) is prescrewed onto the bolt (4) fixed to the booster (1), the nut and its bolt being introduced through a first end zone of enlarged cross-section (9) of an orifice in the wall (3), after which the booster is moved relative to the wall (3), in order to bring the body of the bolt (4) into a second end zone (10) of the orifice of a cross-section corresponding to that of the bolt, the nut (5) then being screwed home against the wall in the assembly position thus obtained. Advantageously, the wall (3) has a projecting part (11) adjacent to the orifice between the first (9) and second (10) end zones of the latter, so that, by putting itself in the path of the nut (5), it opposes a tendency for the unit to come apart.

6 Claims, 2 Drawing Sheets

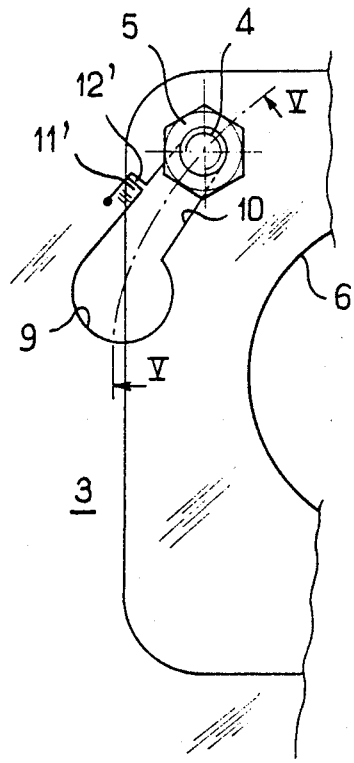
FIG_4
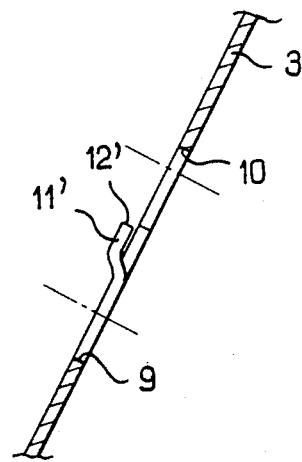
FIG_5

BRAKE BOOSTER UNIT MOUNTED ON A FIXED WALL OF A VEHICLE AND PROCESS FOR ASSEMBLING SUCH A UNIT

The present invention relates to vehicle brake systems and, more particularly, to a brake booster unit mounted on a fixed wall of a vehicle, possessing at least one assembly bolt, fixed to the booster and passing through an orifice made in the wall, and a nut screwed onto the threaded end of the bolt projecting relative to the wall.

Conventionally (see, for example, the document U.S. Pat. No. 3,358,449), a brake booster is mounted on the fixed wall of the vehicle by means of at least one bolt, typically two assembly bolts, introduced from the engine compartment of the vehicle, on one side of the fixed wall, into corresponding circular orifices made in the fixed wall, after which a nut is screwed onto the threaded end of each bolt projecting on the other side of the fixed wall, typically in the passenger compartment of the vehicle, the bolt being screwed home in order to interact with the adjacent face of the fixed wall by coming axially up against it.

Because of the problems involved in making modern vehicles more compact and of less bulk, it is more and more difficult to gain access to the rear face of the fixed wall which is set far back under the dashboard near the central bracket of the latter and the pedal fittings, so that attaching the nut onto the bolt proves long and difficult for the operator and can cause the threads of the nut and/or of the bolt to be crossed, thus contributing to imperfect and even defective assembly.

It is therefore an object of the present invention to overcome these disadvantages by providing a brake booster unit which is mounted on a fixed wall of a vehicle and is of a new design and which avoids the problems of attaching the nut in situ on the bolt and allows higher assembly rates with greater reliability even when access to the booster assembly zone in the passenger compartment is greatly restricted.

For this purpose, according to one feature of the invention, the orifice in the fixed wall of the vehicle has an elongate shape, typically substantially in the form of an arc of a circle, with a first end zone of enlarged cross-section, allowing the passage of the nut previously fitted on the threaded end of the bolt, and connected to a second end zone of the orifice of a cross-section corresponding to that of the bolt.

By means of such an arrangement, the nut can easily be prescrewed onto the bolt, before assembly in situ, after which the bolt carrying the prescrewed nut is engaged through the first end zone of the orifice, the booster subsequently being suitably moved manually, typically rotated about its axis, in order to bring the bolt into the second end zone of the orifice, the nut then being screwed home on the latter by means of a suitable screw-driving or bolt-driving tool.

It is therefore another objective of the present invention to provide a unit of the type in question, having means for keeping the assembled booster in the required position by preventing a tendency for the booster, for example under the effect of pronounced vibrations, to experience a rotational movement in the opposite direction to the assembly direction, capable of bringing the bolts back opposite the first end zones of the orifices in the fixed wall.

For this purpose, according to a more particular feature of the invention, the fixed wall has retention means capable of interacting with the nut screwed in the effective screwing configuration on the bolt located in the second end zone, in order to prevent a tendency for the unit to come apart.

It is yet another object of the present invention to provide a process for assembling a unit of the type in question, which can be carried out particularly simply and quickly and which guarantees perfect accuracy and reliability of the assembled unit, even in large-series production.

For this purpose, according to one feature of the invention, the process involves the steps of previously screwing the nut partially onto the bolt, presenting the booster in front of the fixed wall, with the bolt and its nut opposite the first end zone of the orifice, passing the end of the bolt together with its nut through the first end zone of the orifice, moving the booster manually relative to the fixed wall in order to bring the bolt into the second end zone of the orifice, and then screwing the nut home against the fixed wall in the final position thus assumed by the booster.

The invention will now be described by way of example with reference to the accompanying drawings in which:

FIG. 4 is a view similar to that of FIG. 2, showing a second embodiment of the invention; and FIG. 5 is a diagrammatic sectional view along the sectional line V—V of the zone of the orifice in the fixed wall of FIG. 4.

In the following description and in the drawings, identical or similar elements bear the same reference numerals, if appropriate with indices.

Figure 1:
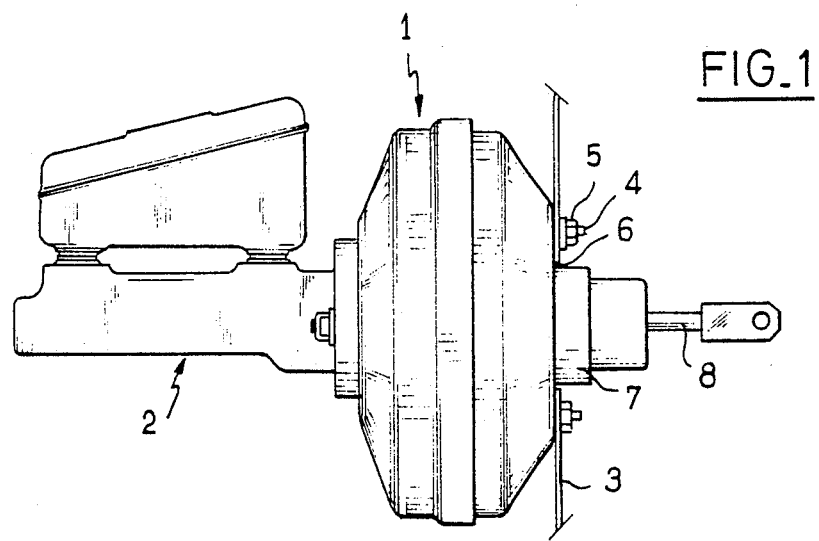
FIG. 1 is a diagrammatic view of a brake booster unit mounted on a fixed vehicle wall.

FIG. 1 shows a conventional mounting of a brake booster of a vacuum type 1 coupled to a brake master cylinder 2 and mounted overhung on the front face of a fixed wall 3 of a vehicle, typically the so-called "fireproof" wall, by means of at least one bolt 4 having one end or head fixed to the housing of the booster 1 and passing through an orifice made in the fixed wall 3, assembly being carried out by means of a nut 5 screwed onto the threaded end of the bolt 4 projecting to the rear relative to the wall 3. Conventionally, the wall 3 has a central aperture 6, through which extends a rear piston hub part 7 of the booster 1, housing a distribution valve means (not shown) actuated by an input rod 8 extending into the passenger compartment of the vehicle and intended to be coupled to a brake pedal (not shown) of the vehicle.

Figure 2:
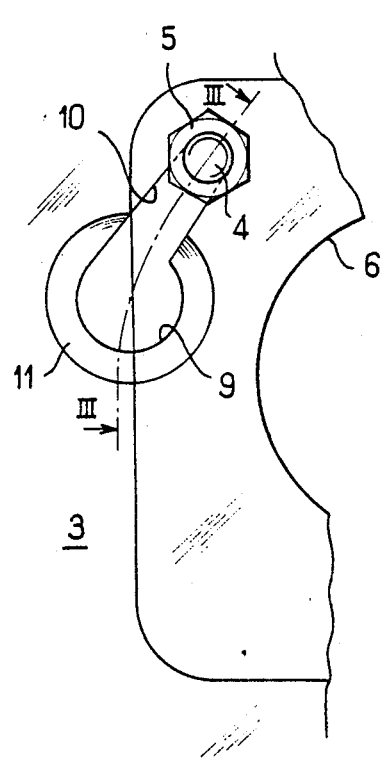
FIG. 2 is a partial diagrammatic rear view showing the fixed wall with its orifice of variable profile, according to a first embodiment of the invention.
Figure 3:
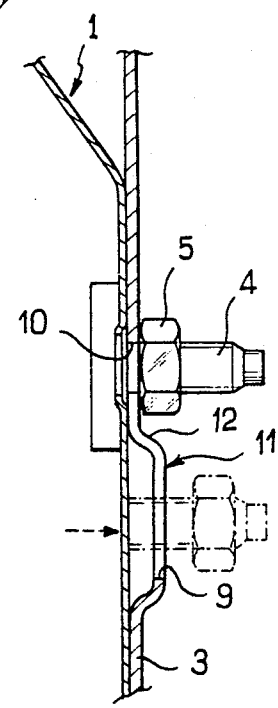
FIG. 3 is a diagrammatic sectional view along the sectional line III—III of FIG. 2.

FIGS. 2 and 3 show the fixed wall 3, the bolt 4 and its nut 5. According to the invention, the orifice in the wall 3, through which the bolt 4 extends, has an elongate shape, advantageously substantially in the form of an arc of a circle, with a first widened end zone 9 of a cross-section larger than the overall cross-section of the nut 5 and connected to a second end zone 10, the cross-section of which corresponds to that of the bolt 4.

By means of such an arrangement, in the assembly process according to the invention, the bolt 5 is previously engaged partially onto the threaded end of the bolt 4, and then (as represented by dot-and-dash lines in FIG. 3) the booster is presented in front of the wall 3, with the bolt 4 carrying its nut 5 opposite the first end zone 9 of enlarged cross-section of the orifice in the wall, the rear face of the booster then being brought up against the front face of the wall 3 as a result of an axial translational movement represented by the broken arrow in FIG. 3, thereby passing the bolt together with its nut through the first end zone 9 of the orifice, after which the booster is rotated (to the right in FIG. 2), thus bringing the bolt 4 up against the end of the second end zone 10 of the orifice in the wall, the nut 5 then being screwed home on the bolt 4 in order to fix the booster 1 and the wall 3 securely to one another, as represented by unbroken lines in FIG. 3.

According to one aspect of the invention, to make it impossible, under the effect of various stresses, in particular pronounced vibrations, for the booster to rotate progressively from its final assembly position towards a position in which the nut 5 would move back opposite the first zone 9 of enlarged cross-section of the orifice, there are provided on the wall 3 retention means which are capable of interacting with the nut 5, screwed home in the final assembly position, by coming up against it and which thus oppose this rotation of the booster. In the embodiment shown in FIGS. 2 and 3, the retention means consist of a stamped dish-shaped zone 11 coaxial relative to the first end zone 9 of the orifice in the wall, so as to define in this way a projecting part or shoulder 12 in the connecting region between the two end zones 9 and 10 of the orifice in the wall, this shoulder 12 then putting itself in the path of the nut 5 should the bolt 4 leave the bottom of the second end zone 10 and approach the first end zone 9.

In the alternative embodiment shown in FIGS. 4 and 5, the retention means consist of a lug 11' cut in the edge of the orifice in the wall in the connecting region between the first and second end zones 9 and 10 and bent back to form a ridge 12' capable of putting itself in the path of the nut 5 should the bolt 4 leave its assembly position in the bottom of the second end zone 10 and return towards the first end zone 9 of enlarged cross-section.

Although the present invention has been described with reference to particular embodiments, it is not limited thereby, but on the contrary can have modifications and alternative forms which will be evident to a person skilled in the art, especially as regards the precise respective shapes of the orifices and the arrangement of the retention means.

We claim:

1. A mounting mechanism for a brake booster unit to be mounted on a fixed wall of the vehicle and with at least one assembly bolt fixed to the booster and having thereon an associated nut, said mounting mechanism comprising an orifice in said wall comprising an elongated shape with a first end zone of enlarged cross-section allowing passage of the nut engaged on the bolt, a second end zone of a cross-section corresponding to that of said bolt, and retention means provided in the wall for interacting with the nut in an effective tightened position on the bolt which is received in said second end zone of said orifice, in order to prevent said brake booster unit from separating from the wall, the retention means comprising the second end zone disposed in planar alignment with the plane of the fixed wall and an offset projecting part of said wall that is in non-planar alignment with the plane of said wall.

2. The mounting mechanism according to claim 1, characterized in that said offset projecting part further comprises a projecting portion of said wall, the projecting portion adjacent the orifice and between said first and second end zones, the projecting portion presenting a lug end positioned for abutment with said nut in order to prevent movement of the bolt into the first end zone.

3. The mounting mechanism according to claim 2, characterized in that said projecting portion comprises a bent lug cut in the edge of said orifice between said first and second end zones.

4. The mounting mechanism according to claim 1, characterized in that said offset projecting part comprises a stamped dish-shaped zone coaxial with said first end zone.

5. The mounting mechanism according to claim 4, characterized in that said orifice has a general shape substantially in the form of the arc of a circle.

6. The mounting mechanism according to claim 5, characterized in that the brake booster is mounted flush to a first surface of the fixed wall as a result of the stamped dish-shaped zone projecting from a second surface on an opposite side of the wall.

* * * * *